United States Patent [19]
Belcher

[11] 3,872,504
[45] Mar. 18, 1975

[54] APPARATUS FOR REDUCING THE WOW AND FLUTTER OF A RECORDING MECHANISM

[75] Inventor: Donald K. Belcher, Springfield, Va.

[73] Assignee: Signa-Signer, Inc., Fairfax, Va.

[22] Filed: Dec. 6, 1972

[21] Appl. No.: 312,656

[52] U.S. Cl. .......................... 360/27, 360/26, 360/29
[51] Int. Cl. .......................... G11b 5/02, G11b 5/43
[58] Field of Search .......... 178/6.6 A; 179/100.2 K, 179/100.2 MD, 100.2 S; 360/27, 29, 36, 51, 26, 28

[56] References Cited

UNITED STATES PATENTS

| | | | |
|---|---|---|---|
| 2,668,283 | 2/1954 | Mullin | 179/100.2 S |
| 2,685,079 | 7/1954 | Hoeppner | 179/100.2 S |
| 3,636,258 | 1/1972 | Brumbach | 178/6.6 A |

*Primary Examiner*—James W. Moffitt
*Assistant Examiner*—Stewart Levy
*Attorney, Agent, or Firm*—John J. Byrne; Edward E. Dyson

[57] ABSTRACT

An apparatus and technique for reducing the wow and flutter associated with recording devices. An input signal containing useful information is recorded on one channel of a recording device and thereafter reproduced as a first input to a first mixer. The reproduced signal contains wow and flutter elements due to variations in the speed of the recording medium. A first reference signal is recorded on another channel of the same recording medium and played back to a second mixer which has as another input a second reference. The difference between the two reference signals contains the same wow and flutter distortion as the signal of the first channel except that the wow and flutter distortion of the second channel is of an opposite sense. When the signal from the second mixer and the signal from the first channel are mixed together the wow and flutter components substantially cancel each other out and the output signal from the first mixer is then restored to its original frequency by means of a third mixer.

7 Claims, 2 Drawing Figures

APPARATUS FOR REDUCING THE WOW AND FLUTTER OF A RECORDING MECHANISM

BACKGROUND OF THE INVENTION

Wow and flutter are the terms used to describe the distortion introduced into a recording medium by variations in the speed of the device that drives or transports that medium. Wow and flutter are often found in tape recorders where the motor speed is not precisely constant. This type of distortion is especially troublesome where the frequency of the signal being recorded contains special information. Minor variations of medium speed can make significant changes in the frequency of the signal being recorded and thereby the output signal that is reproduced is likewise distorted.

One prior art method of reducing wow and flutter is to use a tape driving motor whose speed is relatively constant. However, it is difficult to drive a motor at a constant speed due to small variations in line frequency, load, and other variables.

The reduction of wow and flutter is especially important in machinery used to electronically reproduce signatures or the like. One such electronic signature reproducer is described in U.S. application Ser. No. 129,462 filed Mar. 31, 1971 now U.S. Pat. No. 3,733,612 by Harvey L. Huston and Donald K. Belcher. In that system, the handwriting coordinates are broken up into two channels which record the movement of a pen or stylus in terms of frequencies. Typically, the carrier frequency in such a situation is 1,400 cycles per second and the frequency information causes that carrier to vary plus or minus 90 cycles per second. Therefore, all the information about the location of the stylus or pen is found in a band width of 180 cycles per second. Variations in motor speed can make serious distortions in the frequency information and eventually in the signature to be reproduced. One solution to this distortion problem is described in the copending application Ser. No. 255,788, filed May 22, 1972 now U.S. Pat. No. 3,3803,630 by Donald K. Belcher and Joe T. May. The apparatus described herein is another approach to reducing flutter and wow.

SUMMARY OF THE INVENTION

According to the present invention, an information bearing input signal is recorded on a first channel of a tape recorder or the like. The information from that channel is then played back to a first input of a first mixer. The physical act of recording the information bearing input signal introduces a wow and flutter component to that signal when it is reproduced. A reference signal source whose frequency is equal to the carrier frequency of the information bearing input signal is recorded on a second channel of the recording device and played back into a second mixer. Because both the information bearing input signal and the reference signal source are recorded on the same medium at the same time they both contain flutter and wow distortion in the same sense. A second reference signal is introduced as a second input to the second mixer and the output therefrom is used as a second input to the first mixer. The output of the second mixer passes through a bandpass filter which selects the lower frequency. Because the lower frequency which corresponds to the difference between the two input signals to the second mixer was chosen the input to the first mixer from the second mixer will have a flutter and wow component of an opposite sense than the other input to the first mixer. Since the flutter and wow input components into the first mixer are of an opposite sense they substantially cancel out at the outer mixer. The upper side band is chosen so that the difference between the two inputs is equal to the carrier frequency of the information bearing input signal. The output of the third mixer passes through a bandpass filter to eliminate the upper frequency. The output from that bandpass filter contains the information from the information bearing input signal without the flutter and wow components introduced by the recording mechanism.

Accordingly, it is an object of this invention to reduce the flutter and wow associated with recording mediums.

It is another object of the present invention to substantially reduce or eliminate the flutter and wow components associated with signature reproduction equipment.

It is a still further object of the present invention to eliminate distortion from recording devices.

The subject matter which I particularly regard as my invention is pointed out and distinctly claimed in the concluding portion on this specification. The invention, however, both as to organization and method of operation, together with further advantages and objects thereof, may best be understood by reference to the following description taken in connection with the accompanying drawings.

DRAWINGS

FIG. 1 is a schematic diagram of a circuit according to the preferred embodiment of the invention; and FIG. 2 is a graph showing the amount of flutter and wow reduction that can be achieved with the embodiment of FIG. 1.

DETAILED DESCRIPTION

Figure 1:
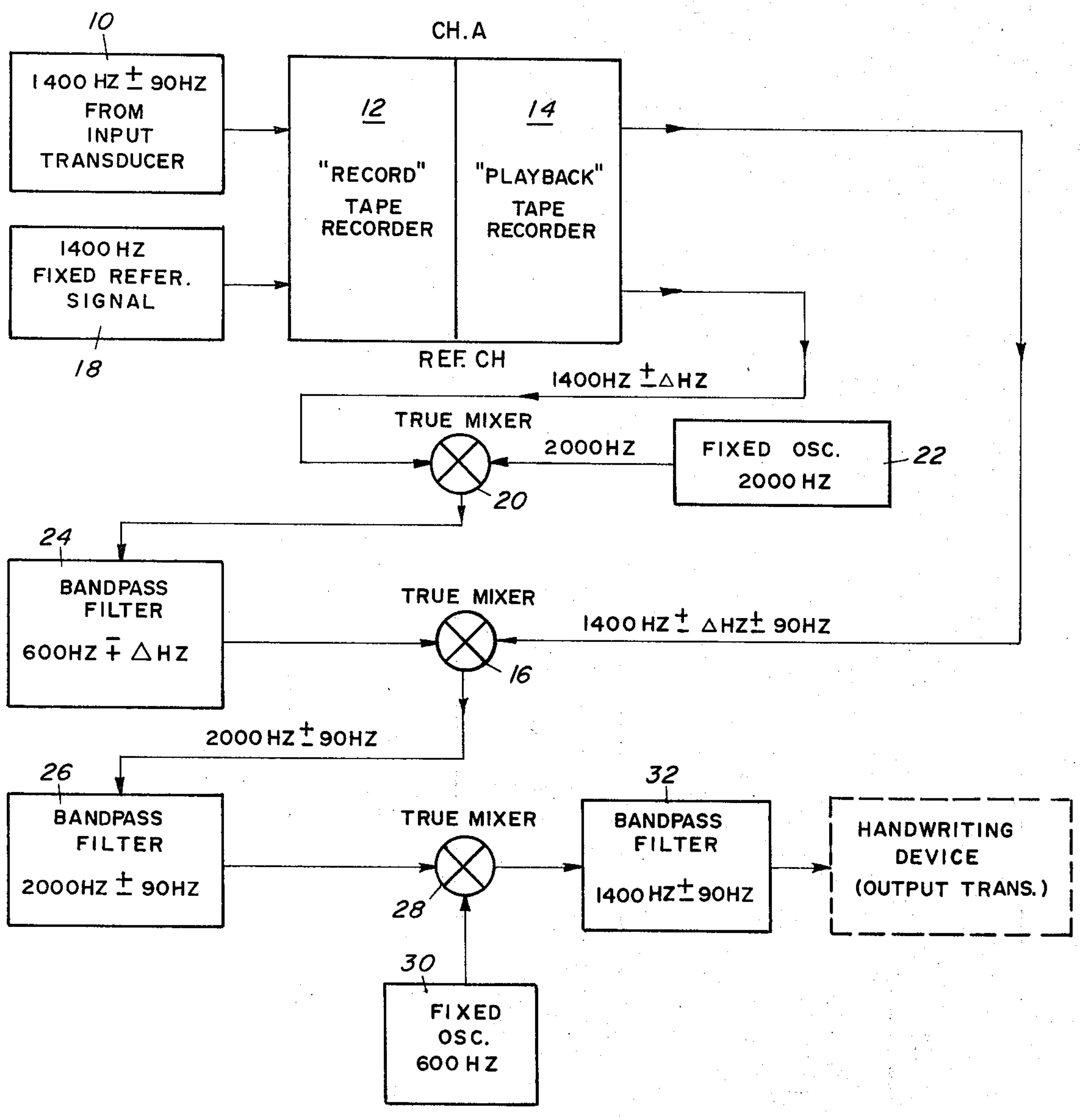

FIG. 1 is the preferred embodiment of the flutter and wow reduction device according to the present invention. An information bearing input signal from an input transducer 10 is recorded on a first channel of a tape recorder or similar recording device. The record section of the tape recorder is designated as element 12. The playback section of the tape recorder 14 reproduces the signal recorded in the record section of the tape recorder 12 and delivers the reproduced signal as a first input to a first mixer 16. Typically, the information bearing input signal from input transducer 10 includes a carrier frequency upon which is superimposed an information frequency. The recording and playing back operations of elements 12 and 14 introduce a flutter and wow component to the otherwise pure input signal from input transducer 10. Therefore, the first input to first mixer 16 includes a carrier frequency plus or minus an information frequency plus or minus a flutter and wow component frequency. A fixed reference source 18 serves as another input to the record section 12 of the tape recorder. The reference signal is recorded on a second channel which serves as a reference channel. It is to be understood that the signals from the input transducer 10 and from the fixed reference source 18 are recorded simultaneously. The playback section of the tape recorder 14 produces an output signal for a second mixer. The record and playback operations of the tape recorder introduce a flutter and wow component to the fixed reference signal. Since the signals from input transducer 10 and fixed reference signal source 18 are recorded and played simultaneously, the flutter and wow components of both reproduced signals are identical. A second fixed reference source 22 serves as a second input to the second mixer 20. The mixer 20 produces an output signal that is either the sum or the difference of the two input signals from the playback section of tape recorder 14 and the second fixed reference source 22. A bandpass filter selects the lower of the two frequencies produced as an output of mixer 20. The output of bandpass filter 24 serves as a second input to mixer 16. Because the lower frequency from mixer 20 was chosen as an input to mixer 16 the flutter and wow distortion associated with the reference channel is now of a different sense. The circuitry associated with the information bearing input signal from input transducer 10 is hereinafter designated as the first means which serves to produce a first input to mixer 16; likewise, the circuitry associated with the fixed reference signal from the first fixed reference signal source 18 is designated as the second means and the output of the second means serves as the second input to mixer 16. It is now to be understood that the flutter and wow components associated with the first and second means are of opposite sense so that when the two input signals to mixer 16 are combined the flutter and wow components substantially cancel each other out. The frequency corresponding to the sum of the inputs to mixer 16; i.e, the upper frequency, is passed by means of bandpass filter 26. The output from bandpass filter 26 passes the upper frequency to serve as a first input to third mixer 28. A third fixed reference signal source 30 serves as a second input to the third mixer 28. The frequency of the third fixed reference signal source 30 is chosen so that the difference between the two inputs to third mixer 28 is equal to the original carrier frequency of the input bearing information signal from input transducer 10. A bandpass filter 32 selects the lower frequency produced by mixer 28 and passes a signal corresponding to the information bearing output signal from the input transducer 10 but with substantially reduced flutter and wow components.

The following is a description of the operation of the preferred embodiment. When used with a signature reproduction device a signal of 1,400 Hz $\pm$ 90 Hz is produced by the input transducer 10. The 1,400 Hz signal is the carrier frequency and $\pm$ 90 Hz represents the coordinate information superimposed on the carrier frequency. In a typical signature reproduction device, two information bearing signals are recorded on separate channels. Therefore, two distortion correction circuits such as shown in FIG. 1 would be employed. A wow or flutter component shown as a $\pm \Delta$ Hz is introduced into the 1,400 Hz $\pm$ 90 Hz signal by the tape recorder and playback mechanism 12 and 14. Therefore, the first input to first mixer 16 is a carrier of 1,400 Hz $\pm$ 90 Hz $\pm \Delta$ Hz. In a manner similar to the foregoing, a 1,400 Hz reference signal from fixed reference signal source 18 is recorded on a reference channel on tape recorder 12 simultaneous with the recording of the 1,400 Hz $\pm$ 90 Hz signal from input transducer 10 on the first channel. The output from the playback section of tape recorder 14 therefore includes the 1,400 Hz reference signal plus or minus the same distortion $\pm \Delta$ Hz as was introduced into the information bearing input signal. The output from the playback recorder 14 is fed into a first input of a second mixer 20 and a mixed with a 2,000 Hz fixed reference signal from fixed reference signal oscillator 22. By taking the lower frequency from the second mixer 22 a signal is produced in which the phase or sense of the flutter and wow distortion components is inverted. The lower side band, in this case, is 600 Hz $\mp \Delta$ Hz flutter and wow distortion component. When the 600 Hz $\mp \Delta$ Hz frequency is mixed with the 1,400 Hz $\pm \Delta$ Hz $\pm$ 90 Hz frequency, the $\Delta$ Hz wow and flutter components substantially cancel out. The sum of the two input frequencies is therefore 2,000 Hz $\pm$ 90 Hz, but the $\Delta$ Hz wow and flutter component has been eliminated. The output of first mixer 16 is therefore the same as the input from input transducer 10 except that it is 600 cycles higher in frequency. In order to create an output frequency which is the same as the information bearing input frequency, the 2,000 Hz signal mixed with a 600 Hz fixed reference from a third reference signal source 30. The 2,000 Hz $\pm$ 90 Hz upper side band is selected from the output of mixer 16 by bandpass filter 26. The output from bandpass filter 26 is mixed with the 600 Hz fixed reference signal from reference oscillator 30. The mixer 28 creates a signal which is the sum and the difference of the two input signals and bandpass filter 32 selects the frequency corresponding to the difference of the two input frequencies to mixer 28. That frequency is 2,000 Hz $\pm$ 90 Hz $-$ 600 Hz $=$ 1,400 $\pm$ 90 Hz, or the original information bearing input signal minus the flutter and wow distortion component. In one embodiment this output signal was then used as an input to a signature or handwriting reproducing device.

Figure 2:
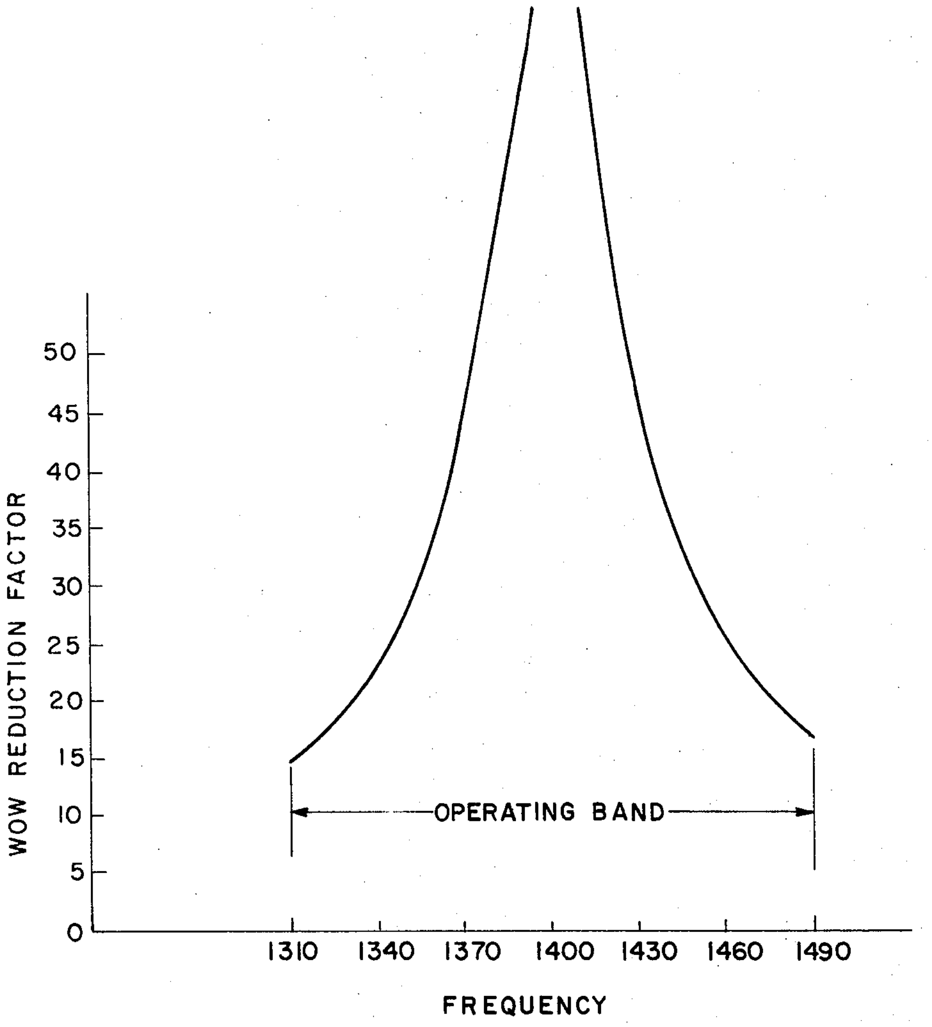

FIG. 2 is a graph of the wow reduction factor versus frequency. The wow reduction factor is defined as the amount of wow distortion in the system before correction divided by the amount of wow in the information bearing output signal after correction.

The following example should serve to illustrate how the embodiment shown as FIG. 1 reduces wow. To calculate the wow at a frequency of 1,490 Hz an arbitrary wow figure is added, in this case 1%, to 1,490 Hz and a distorted output signal 1,504.9 Hz is arrived at. The figure includes a 14.9 Hz distortion signal component. This 1,504.9 signal serves as the first input to mixer 16. Likewise, 1% distortion of the 1,400 Hz fixed reference signal from reference signal source 18 is 1,414 Hz. The second mixer 20 combines the 1,414 Hz signal with a 2,000 Hz signal from fixed reference source 22 and bandpass filter 24 selects the lower of the two frequencies of the output from second mixer 20 and passes that signal on to the first mixer 16. The output of the bandpass filter 24 is therefore 586 Hz. Bandpass filter 26 passes the sum of the two inputs to the mixer 16 or 2,090.9 Hz from bandpass filter 26 and the 600 Hz signal from the third fixed reference signal source 30, and the bandpass filter 32 passes the difference between those two signals as an output signal. In this example, the output signal would therefore be 1,490.9 Hz. The difference between the output signal of 1,490.9 Hz and the input signal of 1,490 is 0.9 Hz distortion. Since the original amount of distortion was 14.9 Hz, it is evident that the wow has been reduced considerably. In this case a wow reduction figure factor of 14.9 Hz/0.9 Hz = 16.6 has been achieved.

In a like manner it can be shown that with a frequency of 1,460 Hz plus 1% wow the wow reduction factor is 24.3. Also, at 1,430 Hz with a 1% wow factor, a wow reduction factor of 47.7 can be achieved.

It is clear from FIG. 2 that the closer the information bearing input signal bearing frequency is to 1,400 Hz the greater is the wow reduction factor that can be attained. It is also evident that the further away from the 1,400 Hz carrier frequency a signal is, the lower its wow reduction factor.

There are several different useful applications of this device. For instance, it is not necessary that the recording device be a tape recorder, rather it could be any device capable of recording two or more channels. Likewise, such a system could be useful for correcting the wow and flutter distortion for machinery other than signature and handwriting reproducing equipment. For instance, such equipment could be used to improve the fidelity of a multitrack stereo-type tape deck.

In a general manner, while there have been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. In a recording and reproducing system, a means for compensation for the wow and flutter frequencies introduced by the recording and reproducing equipment comprising,
- an output transducer,
- a first means for producing a first signal including a first signal component, an information bearing input signal and said wow and flutter frequencies,
- recording equipment for transcribing said information bearing signal on a first channel,
- a playback means for producing a first output signal from said first channel corresponding to said first signal and the output of said playback means being connected to said first mixer means,
- a second means for producing a second signal including a second signal component opposite in sense to said first signal component, and
- a first mixer means combining said first and second signals so that said first and second signal components substantially cancel each other prior to reception of said information bearing input signal by said output transducer.

2. The apparatus of claim 1 wherein said second means include
- a first reference source,
- wherein said recording means transcribes said first reference source on a second channel and said playback means produces a second output signal from said second channel,
- a second reference source, and
- a second mixer for receiving at its inputs said second output signal and said second reference source and for producing said second signal as an input to said first mixer.

3. The apparatus of claim 2 further including a first bandpass filter connected between said first mixer and said second mixer.

4. The apparatus of claim 3 further including,
- a second bandpass filter,
- a third reference source, and
- a third mixer, said second bandpass filter passing only a narrow band of frequencies from said first mixer to said third mixer, said third mixer receiving the output of said bandpass filter and said third reference source as inputs and producing an output therefrom.

5. The apparatus of claim 4 further including a third bandpass filter, said third bandpass filter connected to the output of said third mixer.

6. A recording device comprising,
- a recording medium,
- a recording device for recording at least a first and second channel on said recording medium,
- a playback device associated with said recording device,
- an information bearing input signal,
- said recording device adapted to record said information bearing input signal on said first channel,
- a first mixer having first and second inputs and an ouput, said first input connected to said playback device for receiving the output of said first channel,
- a first reference signal,
- said recording device adapted to record said reference signal on said second channel,
- a second mixer having first and second inputs and an output, said first input of said second mixer connected to said playback device for receiving the output of said second channel,
- a second reference signal,
- said second reference signal connected to the second input of said second mixer,
- a filter having an input and an output, said input of said filter connected to the output of said second mixer and said output of said filter connected to the second input of said first mixer, and
- a frequency normalizing means for returning the frequency of the output of said first mixer to approximately the frequency of said information bearing input signal.

7. The device of claim 6 wherein said frequency normalizing means includes,
- a second filter including an input and an output, said input of said second filter connected to the output of said first mixer,
- a third mixer having a first and second input and an output, the first input of said third mixer connected to the output of said second filter,
- a third reference signal, said third reference signal connected to the second input of said third mixer, and
- a third filter having an input and an output, said input of said third filter connected to the output of said third mixer, said output of said third filter providing an output signal of approximately the same frequency as said information bearing input signal but with substantially reduced wow and flutter components.

* * * * *